United States Patent
Saarnivala et al.

(10) Patent No.: US 11,831,444 B2
(45) Date of Patent: Nov. 28, 2023

(54) MACHINE-IMPLEMENTED METHOD FOR CONFIGURING A RETRANMISSION TIMER AT A CLIENT DEVICE

(71) Applicants: ARM IP LIMITED, Cambridge (GB); ARM LIMITED, Cambridge (GB)

(72) Inventors: Mikko Johannes Saarnivala, Oulu (FI); Szymon Sasin, Oulu (FI); Yongbeom Pak, Oulu (FI); Hannes Tschofenig, Tirol (AT); Kari Matias Severinkangas, Oulu (FI)

(73) Assignees: Arm IP Limited, Cambridge (GB); Arm Limited, Cambridge (GB)

( * ) Notice: Subject to any disclaimer, the term of this patent is extended or adjusted under 35 U.S.C. 154(b) by 107 days.

(21) Appl. No.: 17/310,340

(22) PCT Filed: Jan. 9, 2020

(86) PCT No.: PCT/GB2020/050049
§ 371 (c)(1),
(2) Date: Jul. 28, 2021

(87) PCT Pub. No.: WO2020/157455
PCT Pub. Date: Aug. 6, 2020

(65) Prior Publication Data
US 2022/0190968 A1    Jun. 16, 2022

(30) Foreign Application Priority Data
Feb. 3, 2019  (GB) ..................... 1901467

(51) Int. Cl.
*H04L 1/18*     (2023.01)
*H04L 1/1829*   (2023.01)
(Continued)

(52) U.S. Cl.
CPC ........... *H04L 1/1851* (2013.01); *H04L 67/12* (2013.01); *H04L 67/141* (2013.01)

(58) Field of Classification Search
CPC ..... H04L 1/1851; H04L 67/12; H04L 67/141; H04L 47/70; H04L 47/28
See application file for complete search history.

(56) References Cited

U.S. PATENT DOCUMENTS

2015/0334021 A1* 11/2015 Vadura .................... H04L 69/16
                                                      370/230
2017/0033889 A1*  2/2017 Ma ........................ H04L 69/168
(Continued)

FOREIGN PATENT DOCUMENTS

WO   WO-2019099361 A1 *  5/2019  ............. H04L 5/001

OTHER PUBLICATIONS

Combined Search and Examination Report corresponding to GB1901467.9 dated Jul. 23, 2019.
(Continued)

*Primary Examiner* — Mewale A Ambaye
(74) *Attorney, Agent, or Firm* — Patterson Thuente, P.A.

(57) ABSTRACT

The present techniques generally describe a machine-implemented method for configuring a retransmission timer, the method performed at the server including: receiving, from a client, a first handshake message as part of a first handshake with the client; deriving a retransmission parameter from the first handshake message; setting a first wait time of the retransmission timer based on or in response to the retransmission parameter.

20 Claims, 7 Drawing Sheets

(51) Int. Cl.
  *H04L 67/12* (2022.01)
  *H04L 67/141* (2022.01)

(56) References Cited

U.S. PATENT DOCUMENTS

2019/0098094 A1* 3/2019 Bantoft .............. H04B 7/18508
2022/0124781 A1* 4/2022 Meylan ............. H04W 72/1268

OTHER PUBLICATIONS

Examination Report corresponding to GB1901467.9 dated Oct. 19, 2020.
International Preliminary Report on Patentability corresponding to PCT/GB2020/050049 dated Aug. 12, 2021.
International Search Report and Written Opinion corresponding to PCT/GB2020/050049 dated Feb. 27, 2020.
Tschofenig H, et al., "Transport Layer Security (TLS) / Datagram Transport Layer Security (DTLS) Profiles for the Internet of Things; rfc7925.txt", Transport Layer Security (TLS) / Datagram Transport Layer Security (DTLS) Profiles for the Internet of Things; RFC7925. TXT, Internet Engineering Task Force, IETF; Standard, Internet Society ( ISOC) 4, Rue Des Falaises CH-1205 Geneva, Switzerland, Jul. 19, 2016 (Jul. 19, 2016), pp. 1-61; Chapter 11.

* cited by examiner

MACHINE-IMPLEMENTED METHOD FOR CONFIGURING A RETRANSMISSION TIMER AT A CLIENT DEVICE

The present techniques generally relate to enabling secure communications between devices.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT)

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved (M2M) communication techniques.

According to a first technique there is provided a machine-implemented method for configuring a retransmission timer, the method performed at the server comprising: receiving, from a client, a first handshake message as part of a first handshake with the client; deriving a retransmission parameter from the first handshake message; setting a first wait time of the retransmission timer based on or in response to the retransmission parameter.

According to a further technique there is provided A machine-implemented method for configuring a retransmission timer at a client device, the method performed at the client device comprising: receiving, from a server, a first handshake message as part of a handshake with the server; deriving a retransmission parameter from the first handshake message; setting a first wait time of the retransmission timer based on or in response to the retransmission parameter.

According to a further technique there is provided a machine-implemented method for configuring a retransmission timer at a server, the method performed at a client device comprising: transmitting, to the server, a first TLS/DTLS handshake message comprising a retransmission parameter, the retransmission parameter to cause the server to configure a retransmission timer for the client based on or in response to the retransmission parameter.

The techniques are diagrammatically illustrated, by way of example, in the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
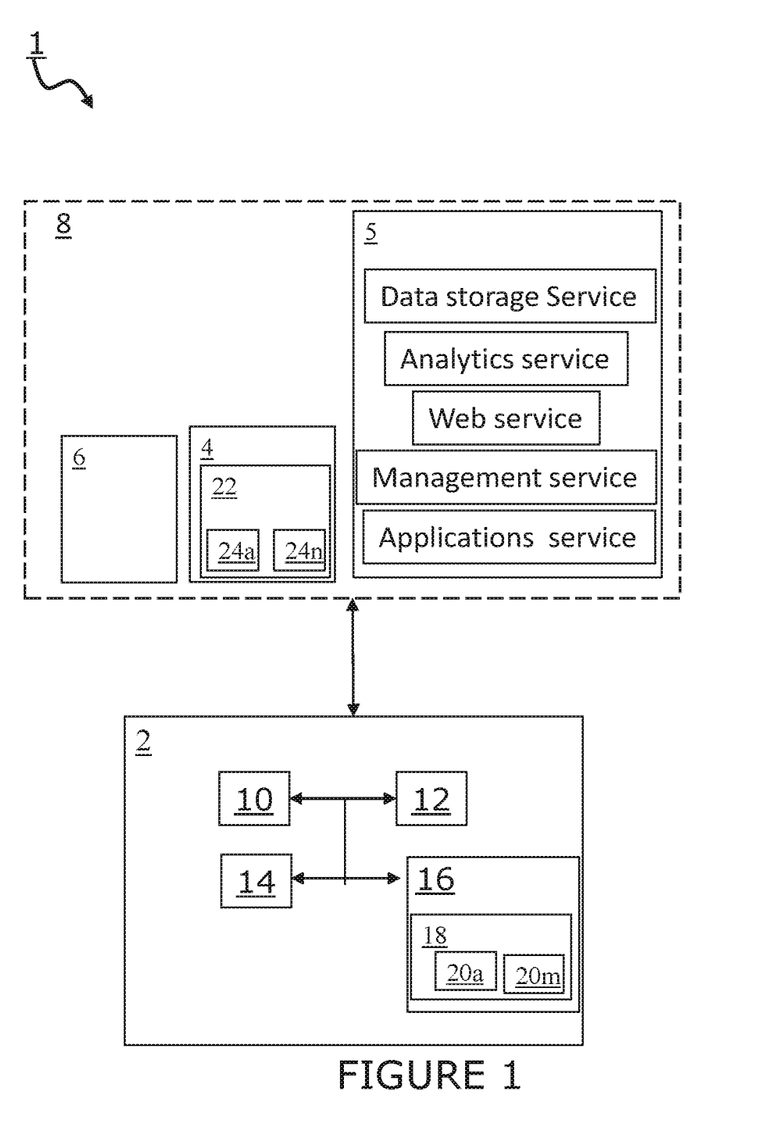
FIG. 1 shows an example deployment scenario for a client device according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks In the present figures, server 4 may, for example, be an application server, an edge server, a LwM2M server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures server 6 comprises a bootstrap server which is used to provision resources on the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the server 4, bootstrap server 6 and/or services 5 are depicted as being part of a device management platform 8, such as the Pelion™ device management platform from Arm®, Cambridge, UK.

The device 2 comprises communication circuitry 10 for communicating with the one or more servers 4 and/or services 5.

The communication circuitry 10 may use wireless communication such as, for example, one or more of: Wi-Fi; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, WebSocket, ZigBee®, Thread® although it will be appreciated that these are examples of suitable protocols.

As an illustrative example, CoAP defines the message header, request/response codes, message options and retransmission mechanisms, such as, for example, RESTful Application Programming Interfaces (APIs) on resource-constrained devices and supports the methods of GET, POST, PUT, DELETE, which can be mapped to methods of the HTTP protocol.

M2M communications are typically required to be secure to reduce the risk that malicious third parties gain access to the data, or to limit the access to data, by devices, servers or services. The device may use one or more security protocols to establish a communications path or channel for providing secure communications between entities as will be described in further detail below.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing resources, such as credential data, whereby the storage circuitry 16 may comprise volatile and/or non-volatile memory.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enroll etc.) with one or more remote entities (e.g. a bootstrap server/server/services).

As above, the client device may use one or more security protocols to authenticate with another server. As an illustrative example, Datagram Transport Layer Security (DTLS) may be used to secure communication between a client device and a server (e.g. bootstrap server, LwM2M server, application server etc.). The data (e.g. credential data) protected by TLS/DTLS may be encoded as plain text, binary TLV, JSON, CBOR, or any other suitable data exchange format.

The client device may perform a connection handshake with another entity to mutually authenticate each other and to negotiate different protocols related to communication, encryption etc.

In DTLS, during a connection handshake process, the client device and server exchange their digital certificates which may be X.509 certificates (also known as, and referred to herein, as identity certificates or public key certificates). Digital certificates comprise credential data is which used to prove the ownership of a public key that is used as part of an asymmetric key algorithm (i.e. which forms part of a public-private key pair). A digital certificate typically comprises information about the public key, information about the identity of its owner (e.g. the client device or server), and the digital signature of an issuing entity that has verified the contents of the certificate (e.g. a trusted third party such as a certificate authority). Similarly, the client device 2 and a server 4, may need to confirm which cryptographic algorithm(s) or ciphers or cipher suites they will use to secure communication sessions. For example, the client device may send a list of cipher suites that it supports, potentially in order of preference. The server selects a cipher suite from the list and informs the client device of this selection. The list of cipher suites may be large, which increases the amount of information sent between machines during a DTLS connection handshake. This means that every time a client device and a server perform a connection handshake process to begin a secure communication session (i.e. a session during which the client device and server exchange encrypted messages), large amounts of data may need to be exchanged.

Datagram transport does not require nor provide reliable or in-order delivery of data. Applications such as media streaming, Internet telephony, and online gaming use datagram transport for communication due to the delay-sensitive nature of transported data. The behaviour of such applications is unchanged when the DTLS protocol is used to secure communication, since the DTLS protocol does not compensate for lost or re-ordered data traffic. Rather, DTLS uses a retransmission timer to time an expected response and to handle packet loss as depicted by process 100 in FIG. 2, whereby at S102 client device 2 initiates a handshake with server 4 by transmitting a handshake message (e.g. ClientHello).

Figure 2:
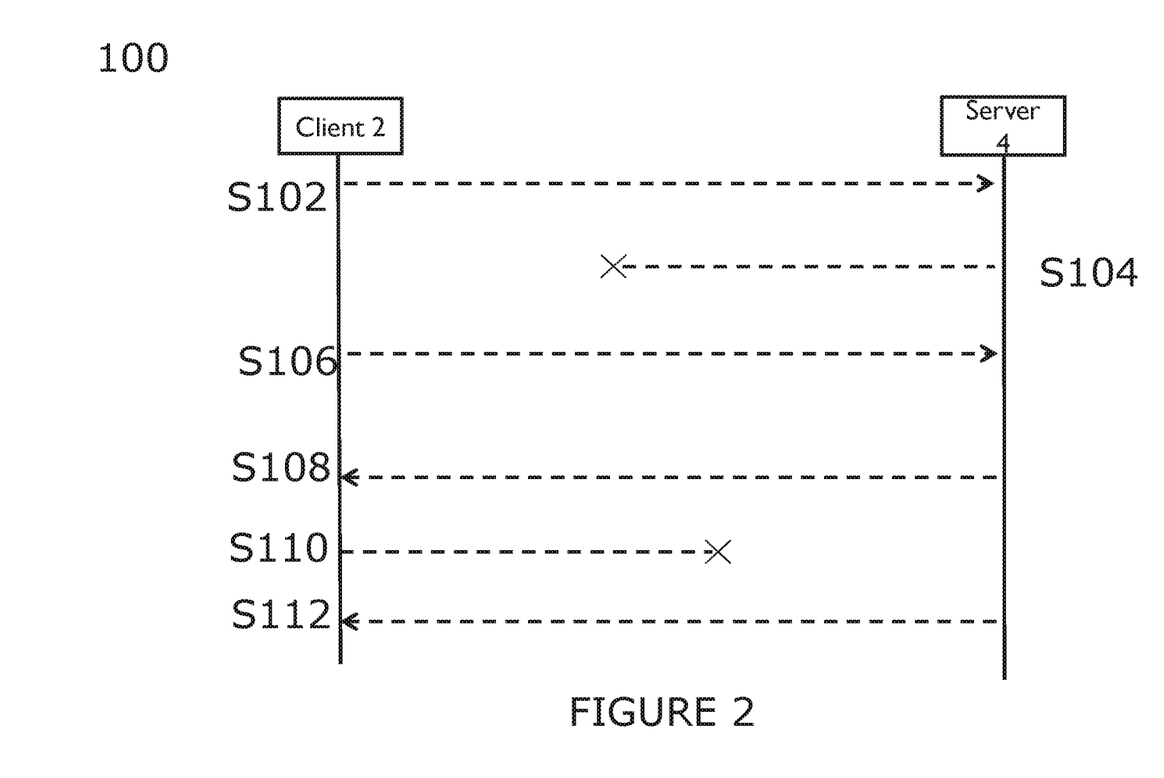
FIG. 2 shows an example process in which a retransmission timer is provided to handle packet loss.

Once the client device 2 has transmitted a first handshake message it awaits an expected response from the server (e.g. HelloRetryRequest).

If, as at S104, the expected response from server is not received before expiry or timeout of a server wait time of a retransmission timer on the client device 2, the client device 2 retransmits the first handshake message (S106).

In some embodiments, handshake messages may be grouped into a series of one or more message flights, such that the client device retransmits a particular flight if an expected response (e.g. an acknowledgement) is not received for that particular flight before expiry of the server wait time.

The server 4 also maintains a retransmission timer and retransmits a handshake message comprising one or more flights when a client wait time of the retransmission timer expires before receipt of an expected response from the client device 2.

In the illustrative example of FIG. 1, at S108 server 4 server transmits a handshake message (e.g. ServerHello) to the client device 2 and awaits an expected response from the client device 2.

If, as at S110, the expected response from client device 2 is not received before expiry of the client wait time, the server 4 retransmits the handshake message, as at S112.

As such, when the client wait time of the retransmission timer on the server 4 expires before receipt of an expected message from the client device 2, the handshake message is retransmitted by the server 4.

However, wait time values can lead to congestion problems, for example, when a wait time of the retransmission time is set to expire earlier than necessary, a handshake message will be retransmitted too quickly which can lead to congestion on a network. Similarly, when a wait time is set to expire after too long a time, the latency may cause issues for time-sensitive applications and degrade performance.

Looking again at FIG. 1, the client device 2 comprises a retransmission timer 18 which comprises a server wait time for server 4, whereby the server wait time is the time the client device waits for an expected message from the server before performing an action on expiry thereof (e.g. retransmitting a handshake message, terminating a handshake etc.) The retransmission timer 18 may be configured by setting the server wait time to a specified value.

The client 2 may communicate with a plurality of servers, and so the retransmission timer 18 may have a server wait time for each server with which it communicates. The server wait times are depicted as server wait times 20a-20m in FIG. 1 (where 'm' is an integer). The retransmission timer 18 of client device may be a hardware and/or software component and in FIG. 1 the retransmission timer is depicted as an application in storage 16. In embodiments, the retransmission timer may be used to measure the time for expected responses from one or more servers in parallel (i.e. substantially at the same time).

Similarly, in FIG. 1, the server 4 comprises a retransmission timer 22 which comprises a client wait time for client device 2, whereby the client wait time is the time the server waits for an expected message from the client device before performing an action on expiry thereof (e.g. retransmitting a handshake message, terminating a handshake etc.) The retransmission timer 22 may be configured by setting the client wait time to a specified value.

The server 4 may communicate with a plurality of client devices, and so the retransmission timer 22 may have a client wait time for each client device with which it communicates. The client wait times are depicted as client wait times 24a-24n in FIG. 1 (where 'n' is an integer). The retransmission timer 18 of server 4 may be a hardware and/or software component, and, in embodiments the retransmission timer may be used to measure the time for expected responses from one or more client devices in parallel.

Figure 3:
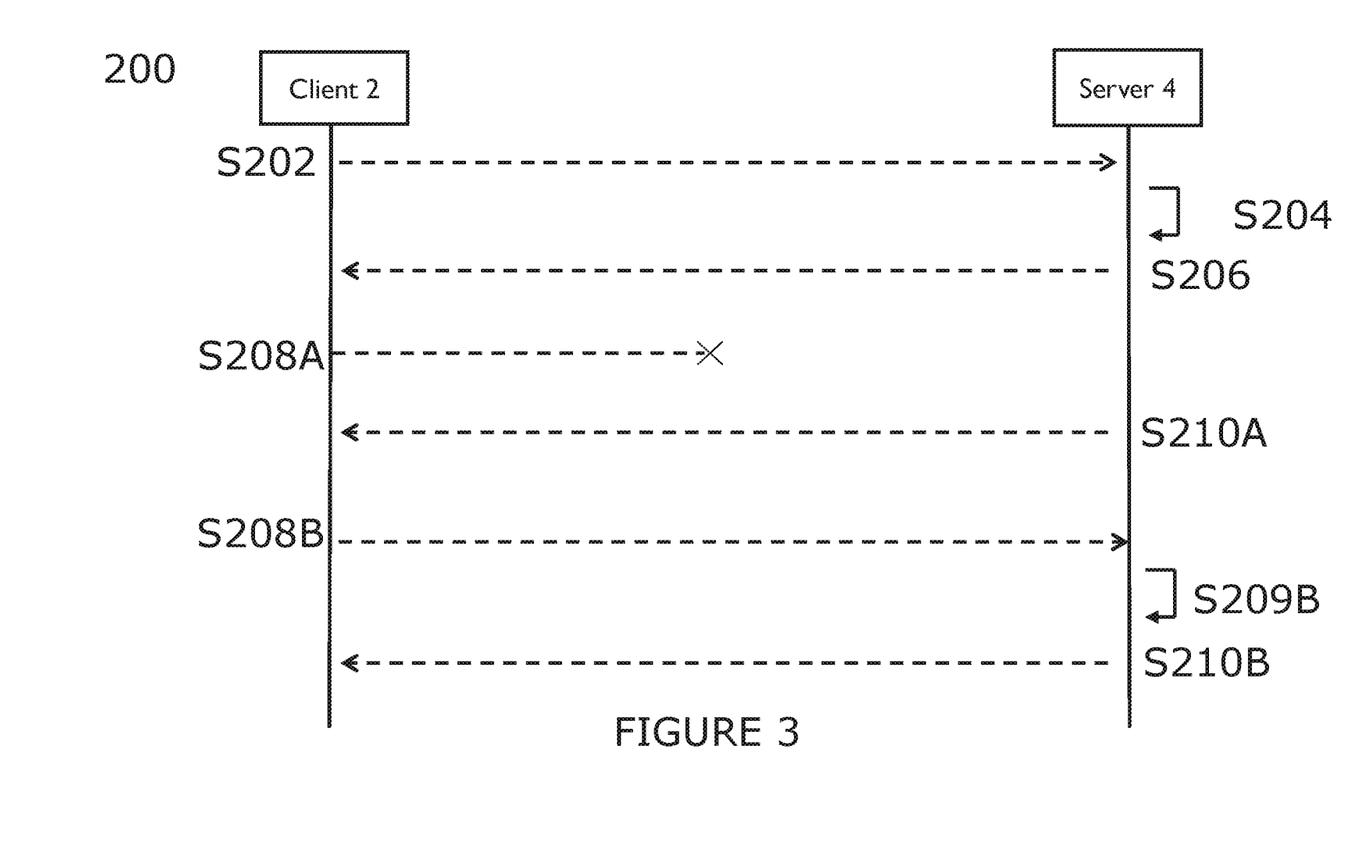
FIG. 3 shows an example of a handshake.

FIG. 3 shows an example of a handshake 200, whereby at S202, the client device 2 sends a first handshake message to the server 4. It will be understood that whilst the message at S202 may be a 'ClientHello', the term "First Handshake Message" is not intended to limit the message at S202 to being the first message in the handshake, rather the term is merely descriptive of the message's position in the illustrative example of FIG. 3.

At S204 the server 4 derives one or more retransmission parameters from the first message and sets a client wait time for the client device 2 based on or in response to the one or more retransmission parameters.

In embodiments the first message may include instructions inserted/injected therein by the client device 2. The server 4 may then derive the one or more retransmission parameters by parsing the instructions. For example, the one or more retransmission parameters may be a suggested server wait time for the next message in the handshake. The server 4 can then use suggested wait time as the client wait time for next expected response from the client device 2.

In an embodiment the first message may include one or more device identifiers to provide information about the device characteristics (e.g. device class; device type; device version number; device firmware number; processor type; device manufacturer etc.). The device identifiers may also include credential data, such as one or more certificates used during an authentication process; one or more cipher suites available to the device; types of cryptographic keys available to the device. The server 4 may then derive one or more device characteristics as one or more retransmission parameters, and sets the client wait time for the client device 2 based on the on or in response thereto.

Figure 4:
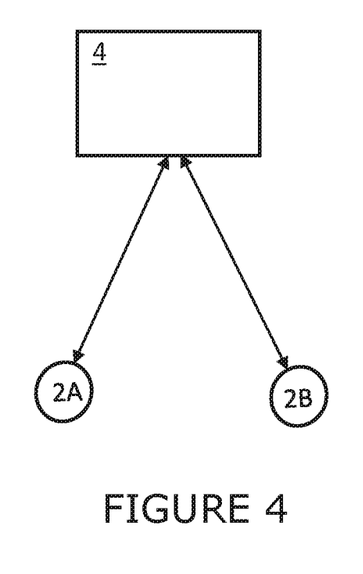
FIG. 4 illustratively shows two client devices in communication with a server according to an embodiment.

As an illustrative example as depicted in FIG. 4, client device 2A may be an LwM2M device, whilst client device 2B may be a relatively high powered device in comparison, such as a dedicated gaming computer.

When device 2A initiates a handshake with server 4, the server 4 may determine that the client device 2A has a particular processor based on information in the ClientHello, and sets a client wait time for client 2A based on the expected time it would take the device having that processor to process and respond to the next message transmitted by the server 4. Such a client wait time may, for example, be set dependent on the cipher suite chosen by the server which the client device has to use to encrypt data.

When client device 2B initiates a handshake the server 4 may determine that the client device 2B has a particular processor which is faster than that in client device 2A, and sets a client wait time for client device 2B based on the expected time it would take the device having that processor to process and respond to messages received from the server 4. Such a client wait time may less than that determined for client device 2A, for example, it may be set at 10 ms.

It will be appreciated that the example of processors is not intended to be limiting, and the server 4 may make the determination as to the client wait time based on one or more other device characteristics.

Looking again at FIG. 3, in an embodiment the first message may include one or more identifiers to provide information about the characteristics of the environment in which the client device is operating in (e.g. network type (e.g. Mesh; NB-IOT; Lora); capacity of the network; network security requirements e.g. symmetric or asymmetric cryptography; round-trip time (RTT) for transmission of a message and receipt of an expected response through the network; temperature of the environment).

Figure 5:
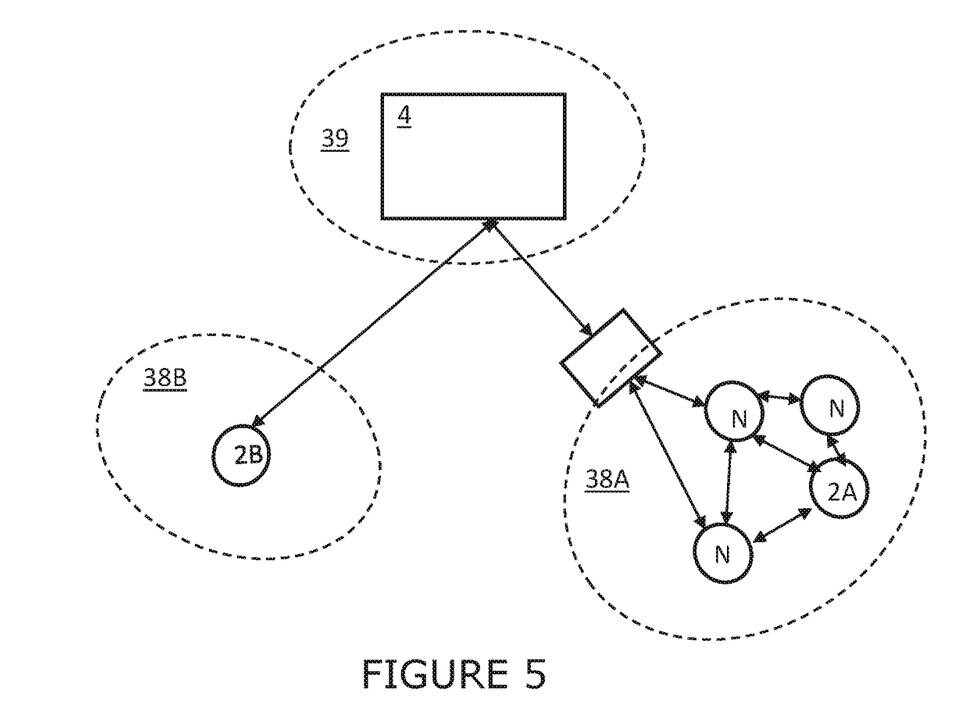
FIG. 5 illustratively shows two client devices in communication with a server according to an embodiment.

As an illustrative example as depicted in FIG. 5, client device 2A may be a node in a mesh network 38A, communicating with server 4 in network 39 via one or more peer nodes (N) of the mesh network, whilst client device 2B is part of an Ethernet network 38B, through which it communicates with server 4.

The server 4 may, from the handshake message, derive one or more environment characteristics as one or more retransmission parameters, and sets the client wait time for the client device 2 based on the on or in response thereto. When device 2A initiates a handshake with server 4 it may include one or more identifiers from which the server 4 can determine that the client device 2A is in a mesh network and communicates via one or more peer nodes. The server 4 can then set a client wait time for client 2A based on the expected time it would take the device in such an environment to receive and respond to messages received from the server 4. Such a client wait time may, for example, be 2.4 seconds.

When client device 2B initiates a handshake the server 4 may determine that the client device 2B is in a faster network and sets the client wait time for client device 2b to be less than that determined for client device 2A, for example, it may be set at 100 ms.

As will be appreciated the server can set the client wait time for a particular device based on one or more device characteristics and/or environment characteristics derived from a handshake messages received from the client device. For example, whilst the particular client device may have a relatively fast processor, it may be in a relatively slow network, and the server will set the client wait time for that particular client device accordingly. In embodiments, the server may also take into account the environment in which it is operating, and of one or more intermediary devices. For example, when the server is aware that an intermediary device between it and the client device is sometimes slow at relaying messages from the client device to the server, then the server will factor the characteristics of that intermediary device into the client wait time. As a further examples, when the network in which the server operates becomes congested messages be slower to propagate therethrough and the server will factor the characteristics of that environment into the client wait time.

Looking again at FIG. 3, at S206, the server responds to the client device 2A with a second handshake message (e.g. with a ServerHello) and waits for an expected response from the client device 2 (e.g. an acknowledgement, certificate, precharged key etc.) The server also starts the retransmission timer to measure the response time for the expected response from client device 2.

When, as at S208A, the server 4 does not receive the expected response before expiry of the client wait time, the server may, as at S210, retransmit the second handshake message, reset the retransmission timer and wait for an expected response from the client device 2. In some embodiments, the server may adjust (e.g. to increase) the client wait time before retransmitting the second handshake message. Alternatively, the server 4 may terminate the handshake with the client device 2 and does not retransmit the second message. In such a scenario the client device may attempt to initiate the handshake again. Such a termination may occur if the server does not receive the expected response after a threshold number of retransmissions or when the client wait time exceeds a threshold. The server may blacklist a client device if it fails to respond to messages from the server. Such functionality may prevent against a denial-of-service attack on the server by the client device.

In a further illustrative example, when, as at S208B, the server 4 does receive the expected response from the client device 2 before expiry of the client wait time, the server 4 may continue the handshake at S210B by sending a further handshake message and expecting a response (e.g. an acknowledgement, certificate, preshared key etc.) within the client wait time set previously.

Alternatively, the server 4 may adjust/update the client wait time for the client device 2 based on one or more instructions, device characteristics and/or environment characteristics derived from the received expected response. At S210B the server 4 may continue the handshake by sending a further handshake message and expecting a response (e.g. an acknowledgement, certificate, preshared key etc.) within the adjusted/updated client wait time. As an illustrative example, the RTT for mesh network topologies may change quickly or data may be encrypted using different algorithms, or the amount of processing the client device is required to perform in response to a server handshake message may vary from one handshake message to the next (e.g. acknowledgement vs encryption), so the client wait time for an expected message may be updated to as a result. Such functionality provides for maintaining a dynamic retransmission timer throughout the handshake, whereby the server can adjust/update the client wait time may be for each handshake message in the handshake.

Once the handshake is complete, the client device 2 and server 4 can exchange secure data, such as application data.

In embodiments the server stores the client wait times for each client device. Thus, when a client initiates a subsequent handshake, the server can reuse a client wait time determined from a previous handshake with the client device or the server can use a client wait time determined from a previous handshake with a different client device have similar device characteristics and/or environment characteristics. Such functionality may reduce the processing burden on the server as the server does not have to calculate the wait times each time a client device performs a handshake therewith.

In some embodiments the server stores two or more client wait times for each client device, whereby the server can determine different client wait times for different handshake messages in the handshake, whereby each client wait time may be dependent on the instructions from a client device, device characteristics and/or environment characteristics, and stores each of the client wait times. Thus, the server can reuse a client wait time for a particular handshake message determined from a previous handshake with the client device or a different client device having similar device characteristics and/or environment characteristics.

In some embodiments the client device and server will engage in a post-handshake exchange (e.g. for updating cryptographic keys; updating connection identifiers, reauthentication etc.) The server 4 may use the client wait time (or adjusted/updated client wait time) set during the handshake for client wait times of the post-handshake exchange. Alternatively, the server may derive one or more retransmission parameters from a first post-handshake message and set a client wait time for the client device 2 based on or in response thereto. The server 4 may then set a client wait time for a future handshake based on or in response to a client wait time determined during the post-handshake message.

In embodiments, further client devices may engage in handshakes with the server 4, and the server 4 can set wait times for each of the different client devices based on the respective device characteristics, environment characteristics and/or instructions received from those devices. Such functionality means that the client wait times can be tailored for each individual device and may address the problem of congestion in a network by reducing the amount of traffic resulting from retransmissions.

In some embodiments, a client device can set a server wait time, for expected handshake messages from the server 4, based on one or more server characteristics or environment characteristics for the environment in which the server 4 is operating.

Furthermore, the client can set/update the server wait time based one or more instructions received from the server 4. Such functionality reduces the computational burden on the client device, whereby the server will instruct the client device as to what the server wait time should be for a handshake message from the server 4. In embodiments the server 4 can define the server wait time for each different handshake message in the handshake.

Figure 6A:
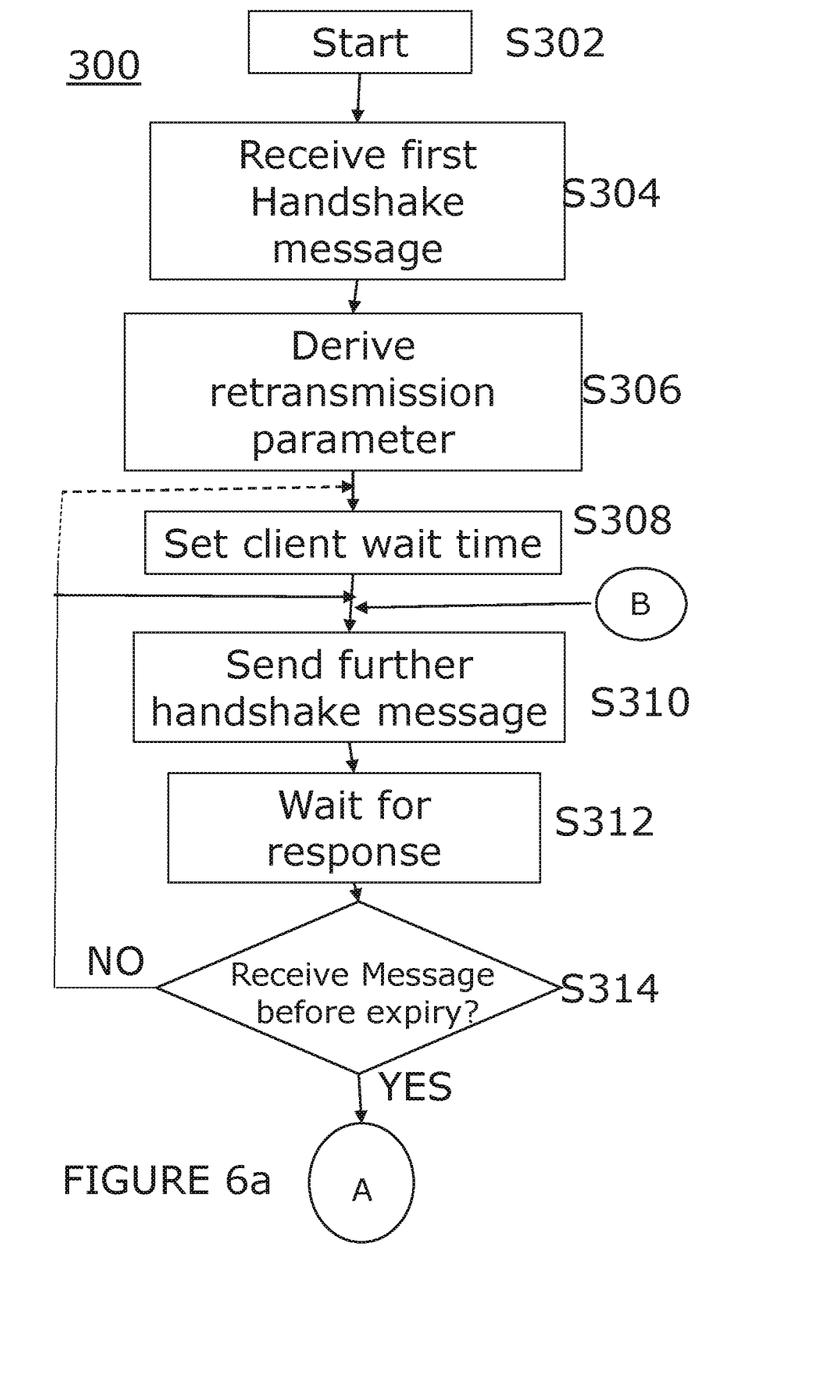
FIGS. 6a and 6b show a flow diagram of example handshake process 300 performed by a server with a client device.
Figure 6B:
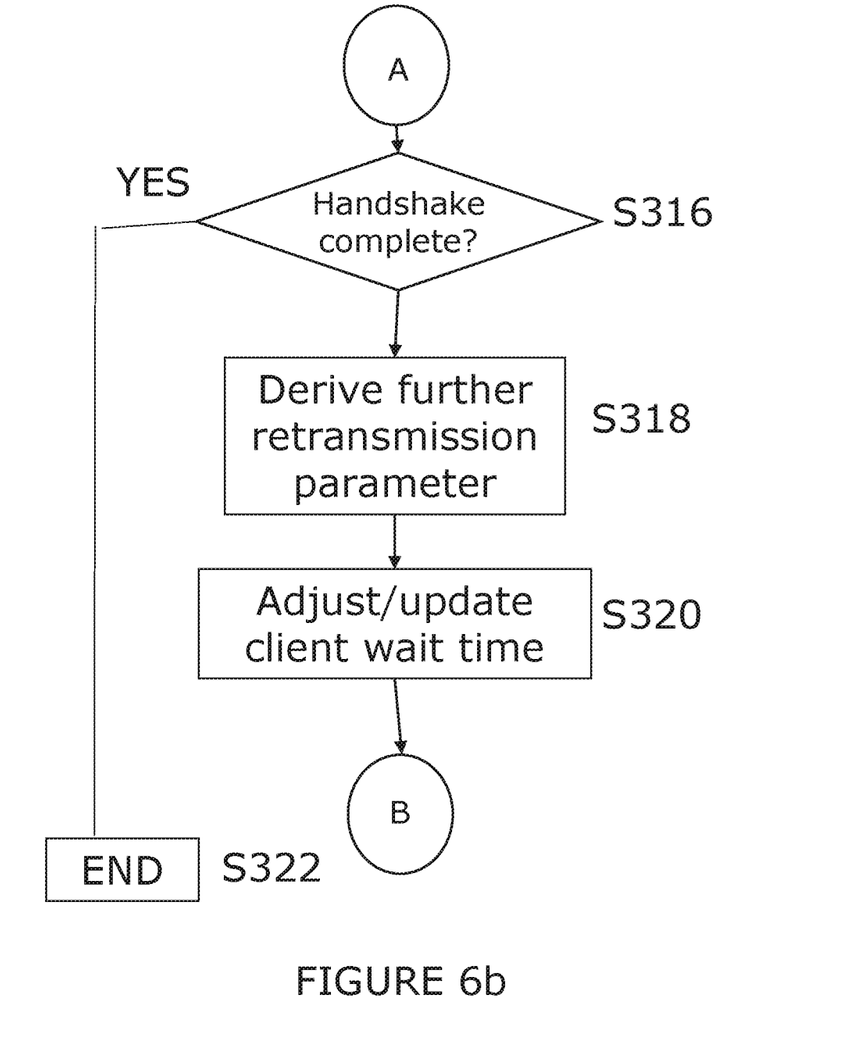

FIGS. 6a and 6b show a flow diagram of example handshake process 300 performed by a server with a client device.

At S302 the process starts.

At S304 the server receives a first handshake message from the client device, whereby the first handshake message comprises one or more message flights.

At S306, the server derives one or more retransmission parameters from the first message and at S308 sets a client wait time for the client device based on or in response to the one or more retransmission parameters.

In embodiments the retransmission parameter(s) may comprise instructions from the client device defining what the client wait time should be. Additionally, or alternatively, the retransmission parameter(s) may comprise one or more device characteristics of the client device. Additionally, or alternatively, the retransmission parameter(s) may comprise one or more environment characteristics relating to the environment in which the client device is operating.

At S312, the server transmits a further handshake message to the client device, resets the retransmission timer and waits for an expected response from the client device.

At S314 when the server does not receive the expected response before expiry of the client wait time, the server may, as at S310, retransmit the further handshake message, reset the retransmission timer and wait for an expected response from the client device. In some embodiments, the server may optionally adjust (e.g. to increase) the client wait time before retransmitting the further handshake message. Alternatively, the server may terminate the handshake with the client device and will not retransmit the second message. (Not shown in FIG. 6a or 6b).

At S314, when the server does receive the expected response from the client device before expiry of the client wait time, at S316 the server determines whether the handshake is complete. When the handshake is not complete and further handshake messages are to be exchanged, at S318 the server derives one or more retransmission parameters from the response and at S320 updates/adjusts the client wait time for the client device based on or in response to the one or more retransmission parameters derived from the response, and, as at S310 transmits a further handshake message to the client device, resets the retransmission timer and waits for an expected response from the client device. As above, when the server does not receive the expected response before expiry of the (updated) client wait time, the server may retransmit the further handshake message, reset the retransmission timer and wait for an expected response from the client device. In some embodiments, the server may optionally further adjust (e.g. to increase) the client wait time before retransmitting the further handshake message. Alternatively, the server may terminate the handshake with the client device and will not retransmit the further handshake message (not shown).

At S316, when the handshake is complete, the handshake ends at S322, and the server and client device can exchange secure communications.

The techniques described above provide for improvements to the client-server handshake process, whereby the server can determine and dynamically adjust client wait times for individual client device(s) by taking account of the environment in which the client devices are operating. Such functionality is particularly beneficial when the client device (s) and server are located in different networks because the handshake messages from the client device(s) can be used to inform the server of potential changes to the environment that may slow/increase the speed of a response from the client device(s), and the server can set/adjust the client wait time accordingly.

Thus, such functionality may result in improved performance due to fewer retransmissions from the server in comparison to the server choosing an arbitrary client wait time. Furthermore, such functionality may also result in improved performance due reduced idle times resulting from the client wait time being increased to avoid the server transmitting a handshake message.

Whilst the embodiments above generally describe DTLS handshakes, the claims are not limited in this respect and the techniques may be applied to TLS handshakes or other types of handshakes.

Embodiments of the present techniques may provide implementations which conform to the Open Mobile Alliance Lightweight Machine to Machine Technical Specification, Version 1.0 and to one or more revision(s) thereof although the claims are not limited in this respect.

Embodiments of the present techniques may provide implementations which conform to the DTLS Protocol, Version 1.0 and to one or more revision(s) thereof although the claims are not limited in this respect.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A machine-implemented method for configuring a retransmission timer, the method performed at a server comprising:
   receiving, from a client, a first handshake message as part of a first handshake with the client;
   deriving a retransmission parameter from the first handshake message;
   setting a first wait time of the retransmission timer based on or in response to the retransmission parameter.

2. The method of claim 1 further comprising:
   sending, to the client, a second handshake message and waiting for an expected third handshake message from the client; and,
   continuing with the first handshake responsive to receiving the expected third handshake message before expiry of the first wait time.

3. The method of claim 2, wherein continuing with the first handshake comprises:
   deriving a further retransmission parameter from the third handshake message;
   adjusting the first wait time of the retransmission timer based on or in response to the further retransmission parameter;
   sending, to the client, a fourth handshake message and waiting for an expected fifth handshake message from the client; and,
   continuing with the first handshake responsive to receiving the expected fifth handshake message before expiry of the adjusted first wait time.

4. The method of claim 2, wherein continuing with the first handshake comprises:
   completing the handshake.

5. The method of claim 2, further comprising:
   adjusting the first wait time responsive to receiving the third handshake message after expiry of the first wait time;
   resending, to the client, the second handshake message and waiting for the expected third handshake message from the client; and,
   continuing with the first handshake responsive to receiving the expected third handshake message before expiry of the first adjusted wait time.

6. The method of claim 2, further comprising:
   terminating the first handshake responsive to receiving the third handshake message after expiry of the wait time.

7. The method of claim 4 comprising:
   receiving a post-handshake message from the client;
   deriving one or more further retransmission parameters from the post-handshake message; and,
   setting a second wait time based on or in response to the one or more further retransmission parameters.

8. The method of claim 7, further comprising:
   setting the second wait time based on or in response to at least one of the first wait time and/or the adjusted first wait time.

9. The method of claim 7, further comprising:
   setting the second wait time based on or in response to at least one of the first wait time or the adjusted first wait time.

10. The method of claim 1, wherein the retransmission parameter from the first handshake message comprises one or more of:
    a device characteristic;
    an environment characteristic relating to the environment in which the device is operating; and
    a device instruction defining what the first wait time is.

11. The method of claim 1, further comprising:
    receiving, from a further client, a handshake message as part of a handshake with the further client;
    deriving a retransmission parameter from the handshake message from the further client; and,
    setting a third wait time of the retransmission timer based on or in response to the retransmission parameter derived from the handshake message from the further client.

12. The method of claim 11, wherein the first wait time and the second wait time are different from one another.

13. The method of claim 1 comprising:
    instructing the client to set a wait time of a retransmission timer thereon.

14. The method of claim 1, wherein the server is in a first network and the client is in a second network.

15. The method of claim 1, wherein the handshake comprises a Transport Layer Security/Datagram Transport Layer Security (TLS/DTLS) handshake.

16. The method of claim 1, comprising at least one of: wherein the server comprises a Lightweight Machine-to-Machine (LwM2M) server; and wherein the client comprises an LwM2M client.

17. A machine-implemented method for configuring a retransmission timer at a client device, the method performed at the client device comprising:
    receiving, from a server, a first handshake message as part of a handshake with the server;
    deriving a retransmission parameter from the first handshake message; and,
    setting a first wait time of the retransmission timer based on or in response to the retransmission parameter.

18. The method of claim 17, further comprising:
    sending, to the server, a second handshake message and waiting for an expected third handshake message from the server; and,
    continuing with the handshake responsive to receiving the expected third handshake message before expiry of the first wait time.

19. A machine-implemented method for configuring a retransmission timer at a server, the method performed at a client device comprising:
    transmitting, to the server, a first Transport Layer Security/Datagram Transport Layer Security (TLS/DTLS) handshake message comprising a retransmission parameter, the retransmission parameter to cause the server to configure a retransmission timer for the client based on or in response to the retransmission parameter.

20. A non-transitory computer readable storage medium comprising code which when implemented on a processor causes the processor to carry out the steps of:

receiving, from a client, a first handshake message as part of a first handshake with the client;
deriving a retransmission parameter from the first handshake message;
setting a first wait time of the retransmission timer based on or in response to the retransmission parameter.

\* \* \* \* \*